United States Patent [19]
Pond et al.

[11] 3,917,196
[45] Nov. 4, 1975

[54] APPARATUS SUITABLE FOR USE IN ORIENTING AIRCRAFT FLIGHT FOR REFUELING OR OTHER PURPOSES

[75] Inventors: C. Ray Pond, Federal Way; Lawrence W. Robinson, Seattle; Patrick D. Texeira, Renton, all of Wash.

[73] Assignee: The Boeing Company, Seattle, Wash.

[22] Filed: Feb. 11, 1974

[21] Appl. No.: 441,401

[52] U.S. Cl. ......... 244/77 R; 244/135 A; 343/5 DP; 343/112 C
[51] Int. Cl.² .......................................... B64C 13/18
[58] Field of Search...... 235/150.271, 150.272, 151, 235/151.3; 244/2, 3, 77 R, 135 A; 250/338; 340/16 R; 343/5 DP, 7.5, 12 R, 17, 17.2, 17.5, 13 R, 14, 112 R, 112 C

[56] References Cited
UNITED STATES PATENTS

| | | | |
|---|---|---|---|
| 2,993,997 | 7/1961 | McFarlane | 250/203 R |
| 3,285,544 | 11/1966 | Chope et al. | 244/135 A |
| 3,620,626 | 11/1971 | Daly et al. | 356/4 |
| 3,644,043 | 2/1972 | Jones et al. | 356/5 |
| 3,706,493 | 12/1972 | Redmann | 356/4 |
| 3,727,055 | 4/1973 | David et al. | 244/77 R X |
| 3,740,141 | 6/1973 | Dewitt, Jr. | 356/5 |

FOREIGN PATENTS OR APPLICATIONS

| | | | |
|---|---|---|---|
| 926,613 | 5/1963 | United Kingdom | 244/2 |

Primary Examiner—Trygve M. Blix
Assistant Examiner—Stephen G. Kunin
Attorney, Agent, or Firm—Christensen, O'Connor, Garrison & Havelka

[57] ABSTRACT

A modulated light beam is projected from a transmitter aircraft toward a receiver aircraft and reflected back toward the receiver aircraft by a retroreflector mounted on the receiver aircraft. The reflected light beam is received by the transmitter aircraft and is focused onto the face of an image dissector tube. The location of the reflected light beam on the face of the tube defines the position of the receiver aircraft in azimuth and elevation with respect to the position of the transmitter aircraft. The range difference between the two aircraft is determined by phase comparing the transmitted light beam with the received light beam. When used for in-flight refueling, further retroreflectors are mounted on a refueling boom and a similar technique is used to determine the exact location of the boom and its associated refueling nozzle. The resultant information is processed by a digital computer and used to either automatically orient the two aircraft, and the boom and nozzle, or create a display(s) suitable for use by one or both aircraft pilots, and the boom operator, to orient the two aircraft, and the boom and nozzle.

18 Claims, 10 Drawing Figures

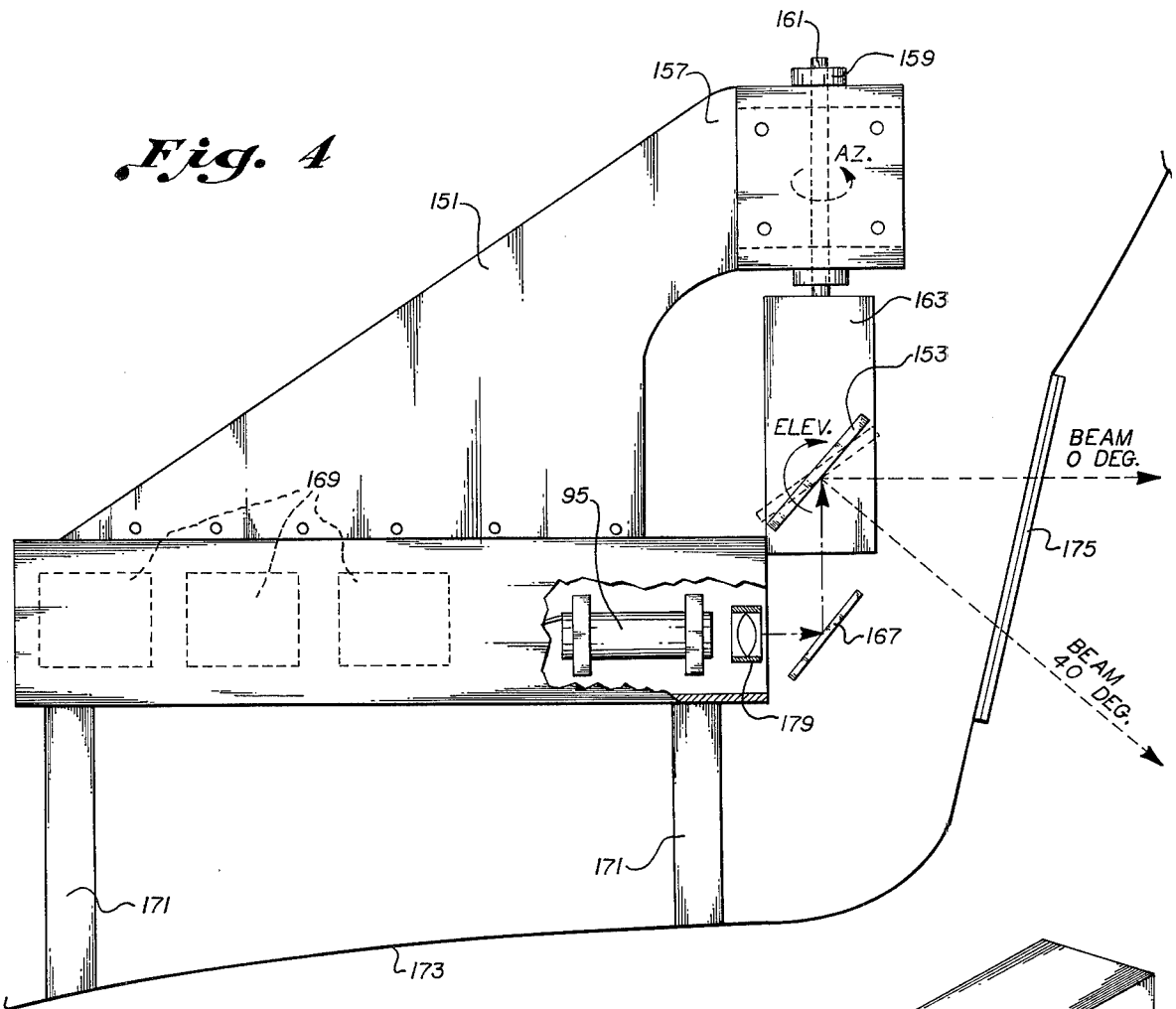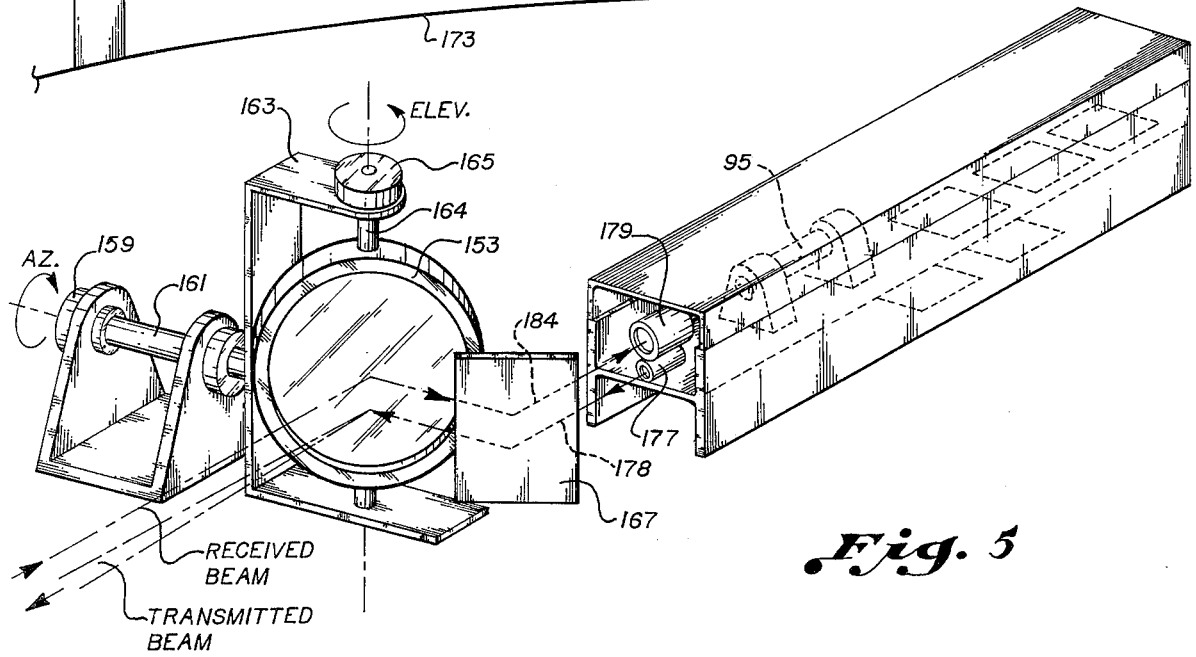

APPARATUS SUITABLE FOR USE IN ORIENTING AIRCRAFT FLIGHT FOR REFUELING OR OTHER PURPOSES

BACKGROUND OF THE INVENTION

This invention is related to aircraft orientation and, more particularly, to orienting two aircraft with respect to one another for refueling purposes and the like.

While the primary use of the present invention is in the field of in-flight refueling of aircraft and it is generally described in that environment, it will be appreciated from the following description that the invention is also useful for related purposes. For example, the invention is useful for orienting remotely piloted aircraft, such as drones and microfighters, with respect to a mother aircraft for capture purposes.

Presently, various systems are used for the in-flight refueling of one aircraft (a receiver aircraft) by another aircraft (a tanker aircraft). One such system uses a drogue/probe apparatus, wherein the aircraft to be refueled includes a probe which is "flown" into a drogue unit. While this type of in-flight refueling apparatus has been somewhat satisfactory, it has a number of disadvantages. For example, the rate of refueling is severely restricted because the diameter of the hose running to the drogue must be relatively small in order for the system to operate satisfactorily.

A second type of presently used in-flight refueling system comprises a boom which extends downwardly and rearwardly from the tanker aircraft. The receiver aircraft connects to a nozzle located near the end of the boom. One of the main advantages of the boom system over the drogue/probe system is that the refueling hose can be much greater in diameter whereby refueling can be accomplished in a much shorter period of time. This invention is directed to improving aerial boom type in-flight refueling systems. More specifically, while aerial boom type in-flight refueling systems have, over the last 20 years, proven to be somewhat satisfactory, they have certain disadvantages. For example, the aerial boom type in-flight refueling systems presently in use require difficult, time-consuming work on the part of the pilots of both aircraft, and on the part of the boom operator. More specifically, aerial boom type in-flight refueling systems require that both aircraft be precisely oriented with respect to one another in order for the boom nozzle to be attached to the receiver aircraft. As the receiver aircraft approaches the tanker aircraft, three-way audio communication between the pilots and the boom operator is utilized to bring the receiver aircraft to a position wherein the desired connection can be made, the tanker aircraft being maintained in steady, level flight. As the receiver aircraft approaches the tanker aircraft from behind and beneath the tanker aircraft, the boom operator makes continuous visual estimates of the position of the receiver aircraft relative to the center of a refueling envelope located about the boom. These estimates are verbally conveyed to the pilot of the receiver aircraft by radio, and visually using a light system on the tanker fuselage.

As will be appreciated, a manual approach to joining or orienting two aircraft is difficult at best, and almost impossible in some circumstances. Because it is difficult, faulty positioning has often occurred and caused damage to the boom and the receiver aircraft. Most frequently faulty positioning occurs in turbulent air, even though it can occur in relatively calm air through operator or pilot error. Hence, in order to reduce such damage, it is desirable to provide information to the boom operator and the pilots that is better than the information presently obtained by visual observation, in order for them to better position the boom and the two aircraft.

It will also be appreciated that, even if damage does not occur, prior art aerial boom type refueling systems have the general disadvantage that they are time consuming because rendezvous must be slow, hook-up must be done carefully (and therefore slowly), and disconnects require new hook-ups.

Therefore, it is an object of this invention to provide a new and improved apparatus for use in orienting one aircraft with respect to another aircraft.

It is a further object of this invention to provide an apparatus suitable for generating information related to the posiition of one aircraft with respect to another aircraft for refueling purposes and the like.

It will be appreciated that, in addition to generating information related to the position of one aircraft with respect to another aircraft, it is also desirable to automatically or semiautamatically control the position of the two aircraft in accordance with this information.

Therefore, it is a still further object of this invention to provide an apparatus for either semiautomatically or automatically orienting one aircraft with respect to another aircraft.

It is yet another object of this invention to provide an apparatus for either semiautomatically or automatically orienting, in-flight, an aircraft to be refueled with respect to a tanker aircraft.

It is still a further object of this invention to provide an apparatus for automatically or semiautomatically controlling, in-flight, a tanker aircraft, a receiver aircraft and an aerial boom in a manner such that the two aircraft can be oriented such that the boom nozzle can be connected and maintained connected to a suitable location on the receiver aircraft during a refueling operation.

In addition to orienting a fuel receiving aircraft with respect to a tanker aircraft, it is also desirable to be able to orient a pilotless aircraft with respect to a mothership (aircraft), for pickup purposes and the like. For example, in recent years, attention has been directed to producing remotely piloted (pilotless) drones and microfighters. Presently, these aircraft are ground based. However, it is desirable to provide a mothership from which these aircraft can be flown. One of the problems with the mothership concept is the difficulty of capturing these pilotless aircraft upon their return to the mothership. This invention is useful in overcoming this problem.

Thus, it is a still further object of this invention to provide an apparatus for automatically orienting a first aircraft with respect to a second aircraft whereby the first aircraft can be captured by the second aircraft.

SUMMARY OF THE INVENTION

In accordance with principles of this invention, an apparatus for orienting one aircraft with respect to a second aircraft while in-flight is provided. One of said two aircraft transmits an electromagnetic beam toward the other aircraft. The other aircraft supports a reflector that reflects a small section of the transmitted electromagnetic beam back toward the first aircraft. The reflected electromagnetic beam is point imaged onto the face of a detecting device. The location of the point image on the face of the detecting device defines the azimuth and elevation of the second (receiver) aircraft with respect to the first (transmitter) aircraft. The range (distance) between the two aircraft is determined by phase comparing the modulation of the transmitted beam with the received beam. Thus, all of the information necessary to establish the relative positions of the two aircraft is sensed by the apparatus of the invention. Signals related to the sensed information are applied to a computer along with signals derived from the inertial platform of the first aircraft. The computer analyzes this information and, in accordance therewith, generates further signals suitable for creating a display(s) depicting the positions of the two aircraft with respect to one another. This display(s) is (are) suitable for use by the pilots of the aircraft to bring the aircraft into a predetermined orientation relationship. Alternatively, the computer processed signals can be utilized to control the autopilots of one or both of the aircraft in order to automatically orient the aircraft in a predetermined manner and maintain the orientation.

In accordance with other principles of this invention the modulated electromagnetic beam is a light beam, preferably in the wavelength region of 0.2 to 20 microns, and the detecting device is an image dissector tube.

In accordance with further principles of this invention, the transmitter aircraft is a tanker aircraft, and the receiver aircraft is an aircraft to be refueled. In addition to the reflector located on the aircraft to be refueled, a further reflector(s) is (are) mounted on an aerial boom lowered from the tanker aircraft. This reflector(s) also intercepts and reflects a small section of the transmitted beam. This reflected beam(s) is (are) also imaged as a point(s) onto the face of the detecting device and, thus, creates information defining the azimuth and elevation of the boom. Preferably, this information includes the position of the nozzle located at the end of the boom. This information is used to create signals that generate displays utilized by the boom operator, plus one or both of the pilots, to bring the receiver aircraft to an orientation position wherein the nozzle can be connected to a refueling receptacle located on the receiver aircraft. Alternatively, an automatic system for controlling the positioning of the boom and nozzle may use this information to position the boom and nozzle (and make the desired connection) as the autopilots of the two aircraft are being controlled to obtain and maintain the desired aircraft orientation.

In accordance with alternate principles of this invention, the transmitter aircraft is a mothership and the receiver aircraft is a remotely piloted aircraft. Rather than a single reflector being located on the remotely piloted aircraft, a plurality of reflectors, arrayed in a predetermined manner, are mounted thereon. Each of the reflectors reflects a small section of the transmitted beam back toward the mothership. The reflected beams are focused so as to create point images on the face of the detector device. The point images are processed to create range and range rate information signals that are utilized by an automatic control system to orient the remotely piloted aircraft with respect to the mothership. Orientation is controlled with respect to the yaw, roll and pitch axes of the remotely piloted aircraft.

In accordance with still further principles of this invention, the reflectors are retroreflectors, i.e., corner reflectors.

In accordance with one preferred form of the invention, the light beam and the face of the image dissector tube covers the entire field of view.

In accordance with an alternate form of the invention, the image dissector tube covers only a predetermined small part of the field of view, such as a section defined by a 6° cone, for example. In addition, the light beam covers only a small part of the field of view, such as a section defined by the 6° cone, for example. The light beam is transmitted, and the reflected beam(s) is (are) received by a scan mirror servo system. The scan mirror servo system scans a field of view and provides, via shaft angle encoders, an indication of the azimuth and elevation "pointing" direction of the mirror. This pointing information, when a reflected beam is imaged on the image dissector tube, provides a rough or coarse indication of the azimuth and elevation position of the receiver aircraft (or boom) with respect to the tanker aircraft or mothership. At the same time, the output of the image dissector tube provides a fine or vernier indication of the azimuth and elevation position of the receiver aircraft (or boom). If desired, the scan mirror can be moved for searching, and the image dissector used for tracking.

In accordance with still further principles of this invention, the light beam is generated by one of the following: a light emitting diode; a laser diode; or, a continuous wave gas laser. In addition, the image dissector tube is a photo multiplier type image dissector tube. Further, range information is provided by a digital system which starts counting at a particular point in the modulation cycle of the transmitted beam and terminates counting when a predetermined point in the cycle of the reflected beam occurs.

It will be appreciated from the foregoing summary that the invention provides a new and improved apparatus for orienting one aircraft with respect to another aircraft. The invention is suitable for controlling an aircraft to be refueled either in an automatic or a semiautomatic manner, if desired. In addition, the invention is suitable for automatically or semiautomatically controlling the positioning of an aerial boom, if desired. Alternatively, the invention can be used to create displays suitable for use in positioning aircraft, and a boom during in-flight refueling. Similar displays are created when the invention is used in an automatic or semiautomatic manner also, in order to provide a manual override capability. Thus, the invention has a wide range of flexibility. This flexibility allows the invention to be used with receiver aircraft having a wide range of avionic capabilities. In addition to providing a system suitable for use during in-flight refueling, the invention also provides a system suitable for use in controlling remotely piloted aircraft during capture by a mothership. In either case, difficult, time-consuming manual requirements are reduced or eliminated.

The heart of the invention is a continuous wave (CW) sensor which transmits a modulated electromagnetic beam, preferably in the light wavelength region from 0.2 to 20 microns. This beam is modulated prior to transmission, and a portion of the transmitted beam is reflected back to the source of the transmission. The information contained in the reflected beam is used for control purposes. When the invention is used in conjunction with in-flight refueling, the sensor information may be used in three automatic control loops, to control the two aircraft and the aerial boom. In a less sophisticated form, the sensor information can be used to control displays only. In either case the disadvantages of prior art systems, particularly those using manual control and voice communications, are reduced or entirely eliminated. The sensor information includes azimuth, elevation and range information. In addition, it may be analyzed to obtain both translational and rate information along one or all of the principal axes of the receiver aircraft. The preferred forms of the invention, which use light beams, are extremely accurate. Moreover, such beams are difficult to detect, particularly if in the infrared range. Thus, the invention can be made relatively secure from enemy observation when used in a military environment.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein:

FIG. 4 is a cross-sectional diagram of a mechanical scanning system suitable for use by the invention;

FIG. 5 is a perspective view of the mechanical scanning system illustrated in FIG. 4;

DESCRIPTION OF THE PREFERRED EMBODIMENTS

Figure 1:
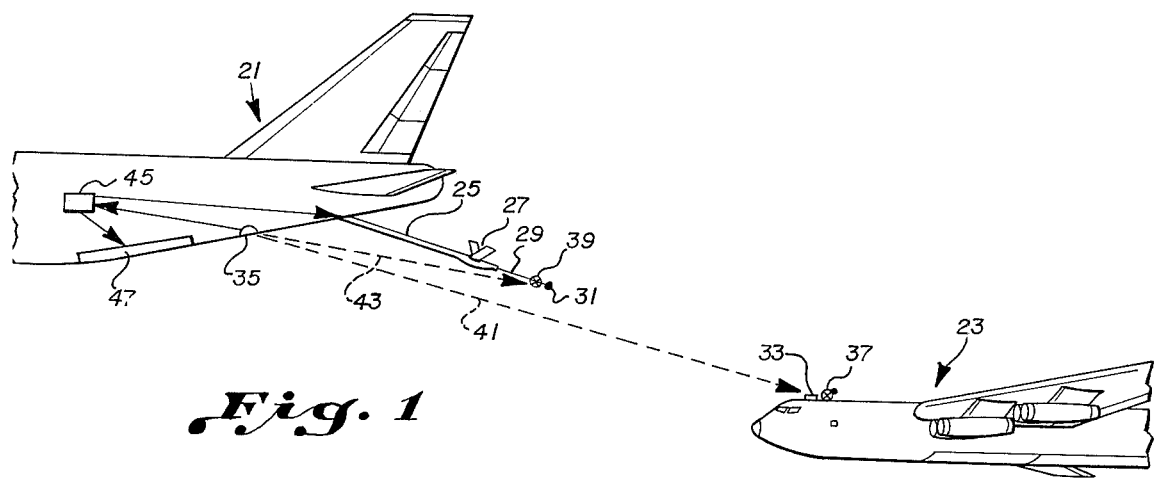
FIG. 1 is a pictorial diagram illustrating two aircraft approaching one another for refueling purposes.

FIG. 1 is a pictorial diagram illustrating a tanker aircraft 21 and a receiver aircraft 23. The receiver aircraft 23 is approaching the tanker aircraft from below and behind for refueling purposes. Refueling is achieved via an aerial boom 25 lowered from the belly of the tanker aircraft 21, as well known in the art, so as to extend downwardly and rearwardly. Mounted on the boom 25 are ruddervators 27 used to control the positioning of the boom in azimuth and elevation. Cylindrically mounted in the boom 21 for inward and outward movement is a telescoping tube 29. Located on the end of the telescoping tube 29 is a nozzle 31. The receiver aircraft 23 includes an aerial refueling receptacle 33 illustrated as being located on the top of the receiver aircraft, near the cockpit.

In accordance with prior art in-flight refueling techniques, the receiver aircraft 23 is guided so as to bring the nozzle 31 in contact with the aerial refueling receptacle 33. In general, such guidance is provided by a voice communication link between the boom operator and the pilots of the two aircraft. The boom operator is located in the belly of the tanker aircraft in a position such that he can observe the receiver aircraft 23. The boom operator guides the pilot of the receiver aircraft 23 in order for him to move (orient) his aircraft such that the aerial refueling receptacle 33 can be connected to the nozzle 31. In addition, visual communication between the boom operator and the receiver aircraft pilot may be used to supplement the voice communication. At the same time, the boom operator controls the position of the nozzle 31 by controlling the azimuth and elevation position of the boom 25 via the ruddervators 27, and the inward and outward position of the telescoping tube 29. During refueling, the boom operator maintains communications with the pilot of the receiver aircraft, so that the connection between the nozzle 31 and the aerial refueling receptacle 33 is maintained. If for one reason or another the connection is broken, the boom operator guides the nozzle and the receiver aircraft back into connection. In addition, the boom operator is in voice communication with the pilot of the tanker aircraft 21 which is in stabilized flight allowing the boom operator and the receiver aircraft pilot to maintain the proper relative conditions.

In accordance with the invention, an apparatus for generating information suitable for use by the boom operator, and either one or both pilots, during the approach of the receiver aircraft, and during refueling, is provided. Alternatively, the apparatus can generate signals useful for semiautomatically, or automatically, obtaining and maintaining the desired connection between the nozzle 31 and the aerial receiving receptacle 33. In general, the apparatus of the invention comprises a continuous wave (CW) sensor system 35 mounted in the belly of the tanker aircraft 21. The CW sensor system generates and transmits a modulated electromagnetic beam preferably in the light wavelength range. The light beam is intercepted by a retroreflector 37 mounted on the receiver aircraft near the aerial refueling receptacle 33. In addition, one or more further retroreflectors 39 are mounted on the boom 25 and/or the nozzle 31. These retroreflectors also intercept the light beam. The retroreflector intercepted portions of the emitted light beam are illustrated by dashed lines 41 and 43.

The intercepted portions of the light beam are reflected directly back to the CW sensor system 35 along paths parallel to dashed lines 41 and 43, in accordance with well known retroreflector principles. The reflected light beams are sensed and cause the generation of azimuth and elevation signals related to the positions of the retroreflectors. In addition, the phase relationship of the emitted beam and the received beam(s) is compared to determine the range (distance) between the retroreflectors and the location of the CW sensor system 35. The range information can be used to determine range rate information, if desired. In any event, the range, azimuth and elevation information is applied to a general purpose digital computer 45. In addition, signals derived from the inertial platform of the tanker aircraft are applied to the computer. The computer converts its input information into signals suitable for controlling an X (elevation), Y (azimuth) display, such as a cathode ray tube rectangular coordinate display 47 (or any other suitable display). The same or a separate display can be used to display range information. The display or displays are suitable for use by the boom operator in manually controlling the position of the boom 25 and the telescoping tube 29. In addition, the signals creating the display may be transmitted to the cockpit of one or both aircraft for controlling displays suitable for use by one or both pilots in controlling their respective aircraft in the desired manner. In addition, the computer signals, modified as necessary, are utilized in a semiautomatic embodiment of the invention to control the position of the boom 25 and the movement of the telescoping tube 29. In a fully automatic embodiment of the invention, the signals generated by the computer are utilized to control the autopilot of the receiver aircraft 23 and, if necessary, make minor corrections to the position of the tanker aircraft 21 via its autopilot.

In summary, the CW sensor system 35 measures both the range and the angular coordinates of the receiver aircraft 23 with respect to the transmitter aircraft 21. Signals representing this data or information are applied to the computer 45. The computer performs appropriate data smoothing and generates signals suitable for controlling the display 47. The pilot of the receiver aircraft 23 views this display as a plurality of light indications on the belly of the tanker aircraft. Moreover, a suitable communications link is provided between the two aircraft so that the information generated by the computer 45 can be transmitted to the receiver aircraft 23 for creating a "heads up" cockpit display similar to the display created on the belly of the tanker aircraft. The pilot of the receiver aircraft 23, in accordance with the display, maneuvers his aircraft to the center of the refueling envelope volume in space as indicated by the display. When the receiver aircraft 23 is in the proper position, the boom and nozzle are extended. As the boom and nozzle enters the sensors field of view, the CW sensor system 35 acquires and tracks the retroreflector(s) 39 mounted on the boom 25. Thus, at this stage of the refueling operation, retroreflectors on the boom and on the receiving aircraft 23 are being tracked. The receiver aircraft 23 is then further maneuvered so that its aerial receiving receptacle 33 is brought nearer to the nozzle 31. When the nozzle 31 is suitably aligned with the aerial refueling receptacle 33, the computer 45 (or the boom operator) sends a command to the boom 25, causing the nozzle 31 to be coupled to the aerial refueling receptacle 33 and refueling begins.

Figure 2:
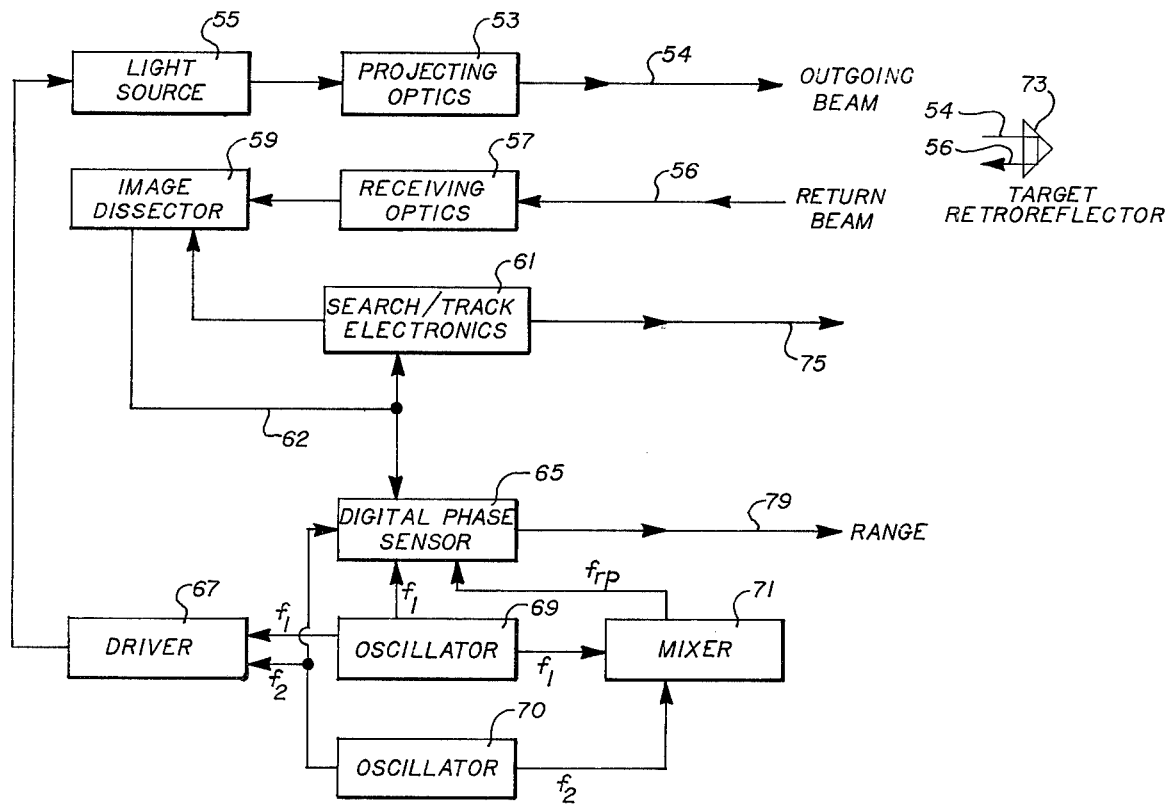
FIG. 2 is a block diagram of a tracking and ranging system formed in accordance with the invention.

FIG. 2 is a generalized block diagram illustrating a "strapdown" or fixed field of view embodiment of the CW sensor system of the invention and comprises: projecting optics 53; a light source 55; receiving optics 57; an image dissector 59; search/track electronics 61; a digital phase sensor 65; a driver 67; a first oscillator 69; a second oscillator 70; a mixer 71; and, a target retroreflector 73.

The light source 55 may take on a variety of forms. For example, it may be a light-emitting diode, a laser diode or a helium neon gas laser. The primary requirement of the light source 55 is that it generate a continuous wave modulated electromagnetic beam, preferably in the light wavelength region between 0.2 and 20 microns. A CW source, such as a continuous wave laser as opposed to a pulsed laser, is preferred because the potential for eye damage to the pilot of the receiver aircraft is considerably less.

The light beam emitted by the light source 55 is projected by the projecting optics 53. The projecting optics projects a cone of light which covers a predetermined arc. In the form illustrated in FIG. 2, the cone covers the entire field of view within which the receiver aircraft can lie and reflect a part of the beam. In an alternate form, as hereinafter described with respect to FIG. 3, the cone is narrow, i.e., covers an arc of 6° or so, and is reflected by a scanning mirror that scans the entire field of view. In either form, wide field or mirror scanned field, the projected or outgoing beam 54 is intercepted by the target retroreflector 73 which may be mounted on the receiving aircraft or on the boom and/or nozzle, as previously described. As previously indicated, the retroreflector 73 is a corner reflector which reflects the intercepted portion of the outgoing beam back toward the scan mirror along a parallel return path. The return beam 56 is received by the receiving optics 57. The receiving optics 57 images the return beam onto the face of the image dissector 59. The image dissector incorporates an internal high gain photomultiplier tube.

The search/track electronics 61 in essence controls the scanning of the face of the image dissector in a standard manner well known to those skilled in the art. Initially a search mode of operation occurs. When a target is sensed the operation switches to a track mode. The location identification signals formed as the face of the image dissector is scanned are applied to an output cable 75. When a target image is located, the signals on this cable define the digital position of the target in azimuth and elevation. In addition, when multiple target images are sensed by the image dissector, the signals applied to the search/track electronics via a cable 62 reflects this condition and the search/track electronics in accordance therewith creates suitable digital signals on output cable 75 suitable for simultaneous tracking of the multiple target images. Thus, the signals on output cable 75 identify the existence of targets and their exact digital location in azimuth and elevation. Hence, the output cable 75 carries signals adequate to define and locate images representing the position of one or more retroreflectors on a display device, such as a cathode ray tube, or adequate to control various other types of instruments adapted to display the position of a target in azimuth and elevation.

A digital measurement technique is used to determine the range (distance) between the two aircraft. In this regard, the first oscillator 69 generates a signal at a first predetermined frequency $f_1$, and the second oscillator generates a signal at a second predetermined frequency $f_2$. Both of these signals are applied to the driver 67, the digital phase sensor 65 and the mixer 71.

The light source is first modulated at $f_1$ by the driver 67. The return signal generated by the image dissector on cable 62 when it detects the return beam is mixed in the digital phase detector with $f_2$ to produce a difference frequency $f_{sl}$. At the same time, $f_1$ and $f_2$ are mixed in the mixer 71 to create a reference phase signal $f_{rv}$. The phase difference between $f_{sl}$ and $f_{rv}$ is measured by a digital counter also forming part of the digital phase sensor. The counter starts counting at a zero crossing of $f_{rv}$ and stops counting at a subsequent zero crossing of $f_{sl}$. The number of counts is, thus, proportional to the phase difference between these two signals. The light source 55 is then modulated at $f_2$ by the driver 67 and the phase is again measured. The resulting pair of phase measurements provides unambiguous high resolution range information, provided the range is less than one-half the beat wavelength of $f_1$ and $f_2$. A signal containing the range information is applied to an output conductor 79. This signal is suitable for creating a range display concurrently with the azimuth and elevation display.

If desired, the digital phase sensor used to determine the range to the retroreflector may also be implemented using a phase lock loop technique, or any other suitable technique. Phase lock loop techniques have the advantage, of course, that they provide a stable system having low noise contribution to the phase measurement used to determine range information. In addition, the phase lock loop control signal, which is used to control lock on the received signal, can provide immediate range rate information, since it is directly proportional to the doppler velocity, or phase velocity, of the received signal.

Figure 3:
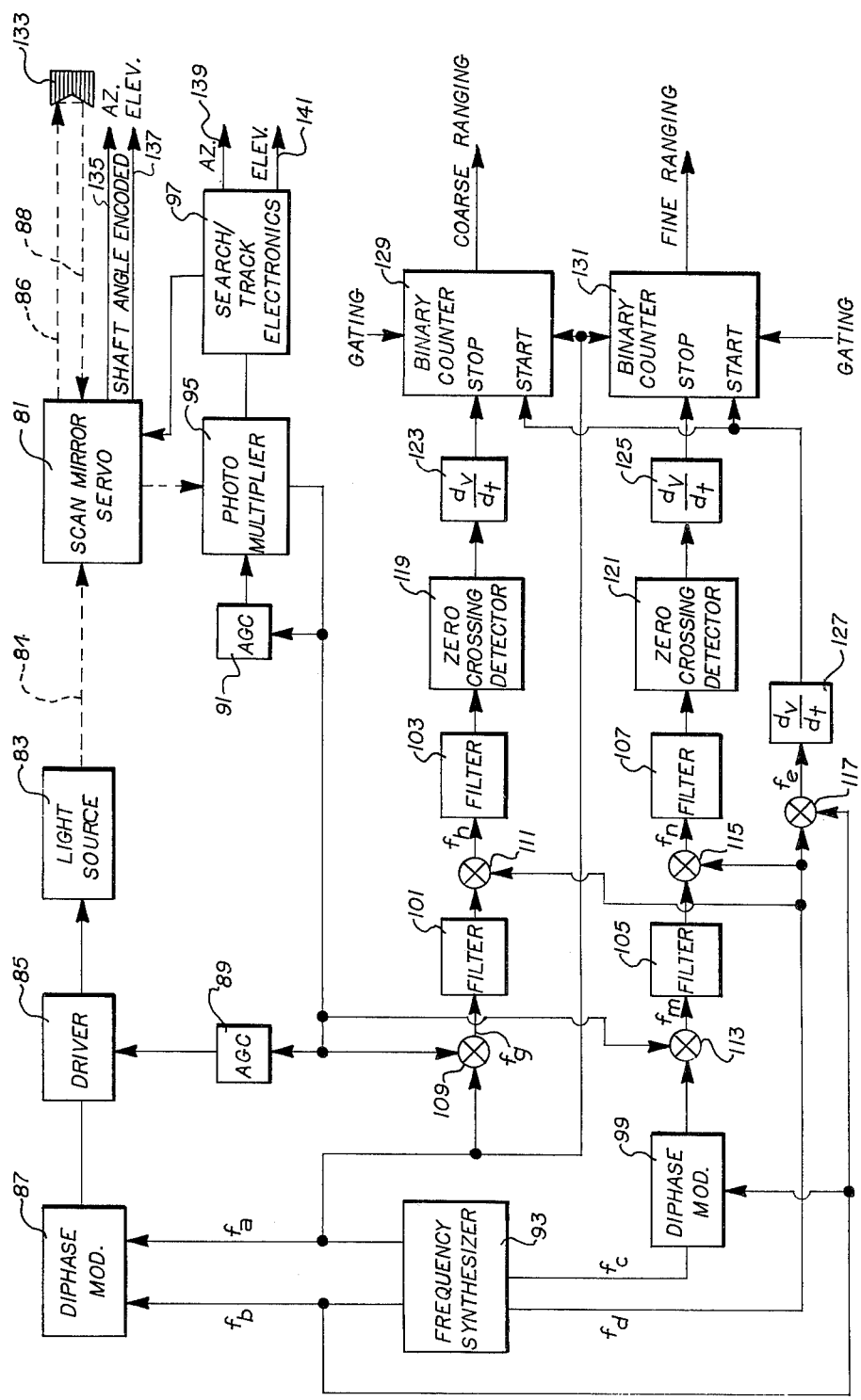
FIG. 3 is a block diagram of an alternate tracking and ranging system formed in accordance with the invention.

FIG. 3 is a block diagram illustrating a scanning mirror embodiment of a sensor system formed in accordance with the invention and comprises: a scan mirror servo 81; a light source 83, a driver 85; a first diphase modulator 87; first and second automatic gain control circuits 89 and 91; a frequency synthesizer 93; a photomultiplier (image dissector) 95; search/track electronics 97; a second diphase modulator 99; four filters 101, 103, 105 and 107; five two-input summers or mixers 109, 111, 113, 115 and 117; two zero-crossing detectors 119 and 121; three differentiator circuits 123, 125 and 127; two binary counters 129 and 131; and, a target retroreflector 133.

The diphase modulator, in accordance with its input signals, generated in the manner hereinafter described, controls the driver 85. In turn, the driver controls the light source 83 so that, preferably, a modulated continuous wave light beam 84 is emitted. The light beam 84 is intercepted by the scan mirror servo 81 and projected outwardly from the tanker aircraft in the desired direction in a sweeping manner over a predetermined field of view. A portion of the thusly projected light beam 86 is intercepted by the target retroreflector 133 and reflected back to the scan mirror servo as a return beam 88. The return beam 88 is imaged by the scan mirror servo onto the photomultiplier 95. If desired, projection and reception optics can be included between the light source and the scan mirror servo, and the photomultiplier and the scan mirror servo, respectively.

The resolver portion of the scan mirror servo continuously generates shaft angle encoded signals representing the azimuth and elevation of the scan mirror at all times. These signals are applied to output conductors 135 and 137 and essentially provide rough or coarse information about the azimuth and elevation position of the target retroreflector. The photomultiplier 95 through the search/track electronics 97 generates fine or vernier azimuth and elevation signals on conductors 139 and 141. That is, the face of the photomultiplier is electronically scanned in any well known manner. As it is scanned, position-related signals are generated defining the position of the return beam. These signals, via the search/track electronics, create the vernier azimuth and elevation signals.

The search/track electronics 97 also controls the movement of the scan mirror servo in a manner such that the mirror is moved in a scanning manner over the desired field of view when in a search mode of operation. This movement causes scanning by the light beam as well as scanning of the field of view to detect returning light beams. After a beam is detected the system is switched to a track mode of operation and the beam(s) are tracked.

The second automatic gain control (AGC) circuit 91 prevents high intensity sun rays from destroying the photomultiplier. More specifically, the output of the photomultiplier is applied to the input of the second AGC circuit and the output of the second AGC circuit is connected to control the voltage applied to the multiplier elements of the photomultiplier. Thus, when sunlight is imaged on the face of the photomultiplier tube, the multiplier voltage is immediately reduced.

In addition, the output of the photomultiplier is applied through the first AGC circuit 89 to the light driver 85. The first AGC circuit is, thus, connected in a feedback loop manner to control the intensity of the light emitted by the light source 83.

The frequency synthesizer 93 generates four signals designated $f_a, f_b, f_c$ and $f_d$. These signals can be at a variety of different frequencies. For purposes of discussion, however, the frequency of $f_a$ is defined as 15 Hz; $f_b$ is defined as 150 kHz; $f_c$ is defined as 14.85 Hz; and $f_d$ is defined as 142.5 kHz. $f_a$ and $f_b$ are applied to the diphase modulator 87. Thus, the diphase modulator generates a 15 Hz output having two different phases. In accordance with well known principles, the first phase, with respect to a reference point, is designated the zero phase. This phase exists for the first half of a 150 kHz cycle. Thereafter, the output signal of the diphase modulator slips by 180°. The 180° phase exists for the second half of the 150 kHz cycle. Thereafter, the 15 Hz output of the diphase modulator returns to its zero phase state and the sequence starts again.

The output from diphase modulator is applied to the driver 85 which, in turn, modulates the light source 83. Thus, the light source is modulated at a 15 Hz rate, which rate shifts in phase between zero degrees and 180° at a 150 kHz rate.

$f_b$ and $f_d$ are summed or mixed by the fifth summer 117, resulting in the generation of a 7.5 kHz signal designated $f_e$. $f_e$ is differentiated by the third differentiator 127 and applied to the start input of both of the binary counters 129 and 131. $f_a$ is applied to the clock inputs of both binary counters. Thus, counting is started at a 7.5 kHz rate and pulses are counted at a 15 Hz rate.

The output of the photomultiplier 95 is summed or mixed in the first summer 109 with $f_a$. This summation removes the carrier frequency (15 Hz) from the output of the photomultiplier and results in the generation of a 150 kHz signal designated $f_g$. $f_g$ is filtered by the first filter 101 and summed or mixed in the second summer 111 with $f_d$ resulting in the generation of a 7.5 kHz signal designated $f_h$. $f_h$ is filtered by the second filter 103 and applied through the first zero crossing detector 119 and the first integrator 123 to the stop input of the first binary counter 119. Thus, the first binary counter stops counting at a 7.5 kHz rate. The time between starting and stopping counting by the first binary counter is determined by the light transmission time, i.e., the time it takes for the light beam 86 to reach the target retroreflector and return to the photomultiplier 95. This time, of course, is related directly to the range between the target retroreflector and the light source. The output of the first binary counter contains coarse range information. The information is coarse rather than fine because the phase information (necessary to obtain fine range information) applied to the light source 83 by the diphase modulator has been removed, as will be understood by those skilled in the art from viewing FIG. 3 and the foregoing description.

$f_b$ and $f_c$ are applied to the two inputs of the second diphase modulator 99. As with the first diphase modulator, the output of the second diphase modulator is a two-phase signal that is continuously shifting 180° between two reference points at a 150 kHz rate. However, the output frequency of the second diphase modulator is 14.85 mHz rather than 15 mHz. The output of the second diphase modulator is summed or mixed with the output of the photomultiplier 95 by the third summer 113. Because these are both diphase signals having the same diphase rate - 150 kHz, the third summer 113 ignores the phase information contained therein. That is, the third summer 113 does not "remove" the phase information as did the first summer 104 heretofore described. Thus, the output of the third summer 113 is a 150 kHz signal designated $f_m$ which contains phase information. The output of the third summer 113 is applied through the third filter 105 to one input of the fourth summer 115 wherein it is mixed or summed with $f_d$. The fourth summer beats down $f_m$ to create, without loss of phase information, a 7.5 kHz signal designated $f_n$. $f_n$ is applied through the fourth filter 107 of the input of the second zero crossing detector 121. The output of the second zero crossing detector 121 is applied through the second differentiator 125 to the stop input of the second binary counter 131.

Because $f_n$ contains information, the second binary counter provides fine ranging information. As an example of the range resolution of the invention, each pulse output of the first binary counter can be chosen to represent 0.5 meters and each pulse output of the second binary counter can be chosen to represent 0.5 centimeters.

Both the first and the second binary counters 129 and 131 are gated on and off by external gating signals, as indicated by the gating input to these counters. Any suitable external gating signal generating means, such as a switch (solid state or otherwise), can be used, as desired.

While a diphase modulation system has been illustrated in FIG. 3, it will be appreciated that this illustration is merely one example of the various types of CW modulated ranging systems that can be used by the invention. For example, standard phase modulation techniques wherein a modulation signal is phaseshifted plus and minus by a predetermined amount (such as 60°) can be used. The thusly shifted phase signal can be utilized to generate both coarse and fine range information. More specifically, the output of the photomultiplier, which includes phase information, could be applied to a pair of suitably filtered phase locked loops, which in turn generate the stop signals applied to the binary counters. In this regard, it should be noted that the use of phase locked loops in place of the zero crossing detectors illustrated in FIG. 3 has certain advantages which may make such a system preferred in certain circumstances. On the other hand, a zero crossing detector system has certain advantages which may make it preferred in other circumstances. For example, a phase locked loop system tends to smooth the received signal and, thus, eliminates noise and other undesired information (which could cause erroneous operation of the invention). On the other hand, the time constant of a phase locked loop system is longer than the time constant of a zero crossing detector system. Consequently, the phase locked loop system may be preferred when the aircraft are widely separated and the zero crossing detector system preferred when the aircraft are near one another and a higher data rate is desired. In such a case, a combination of both systems can be used in combination with a switching means for manually or automatically switching from one system to the other system.

FIGS. 4 and 5 illustrate, in mechanical form, a scan mirror servo suitable for use in the embodiment of the invention illustrated in FIG. 3. FIG. 4 illustrates, in cross section, a scan mirror servo arrayed for use in an aircraft. For ease of understanding, FIG. 5 illustrates, in perspective, such a servo absent the surrounding aircraft structure.

The scan mirror servo illustrated in FIG. 4 comprises a rigid support member 151 designed to support a scan mirror 153 at right angles to the optical axis of the photomultiplier 95. More specifically, an upwardly and outwardly extending arm 157 of the rigid member 151 supports a servo motor 159. The shaft 161 of the servo motor 159 is generally vertically arrayed and supports a U-shaped yoke 163. The yoke 163 supports the scan mirror 153.

The scan mirror 153, as best illustrated in FIG. 5, is actually mounted on the shaft 164 of a second servo motor 165. The second servo motor 165 is mounted on the yoke 163. The second servo motor rotates the scan mirror 153 about an axis lying at right angles to the axis of the shaft 161 of the first servo motor 159, i.e., the shaft 164 of the second servo motor 165 is essentially horizontally arrayed. Thus, when the rigid support member 157 is suitably mounted on an aircraft, the first servo motor 159 rotates the scan mirror through an azimuth angle and the second servo motor rotates the scan mirror through an elevation angle. The extent of rotation in azimuth and elevation defines the overall field of view observed by the photomultiplier 95. The search/track electronics control the energization of the first and second servo motors and, thus, scanning by the scan mirror.

A fixed mirror 167 is mounted so as to intercept the light beam emitted by the light source 177 and direct it toward the scan mirror 153, as illustrated by the arrow 178. Thus, the light beam sweeps or scans the field of view as the servos move the scan mirror in a sweeping or scanning manner.

The rigid support member 151 and its associated components are rigidly supported by rigid installation supports 171 in the belly 173 of the tanker aircraft in a manner such that the servo scan mirror 153 is oriented so as to project the light beam through a window 175. More specifically, the light beam is first bent at right angles by the fixed mirror 167 and directed toward the reflective surface of the scan mirror. The reflective surface of the scan mirror bends the light beam again so that it is emitted behind and downwardly from the tanker aircraft through the window 175. As the servos move the scan mirror, this emitted beam is transmitted from the aircraft in a scanning manner.

Light reflected by the retroreflector(s) forms a received beam(s) 182 that is (are) intercepted by the scan mirror. The received beam(s) is (are) bent toward the fixed mirror 167 by the scan mirror 153. The fixed mirror 167 directs the received beam(s) 182 toward the face of the photomultiplier 95. Located between the photomultiplier 155 and the fixed mirror 167 is a receiving lens 179. Obviously the received beam(s) is (are) only received and directed in this manner when the scan mirror is in a scanning position wherein it is pointing the emitted beam toward a retroreflector(s). The transmitted and received beams are separated, as illustrated, in order to prevent optical feedback.

It will be appreciated from the foregoing discussion of the support structure illustrated in FIGS. 4 and 5 that the servo motors are adapted to move the scan mirror 153, in a scanning manner, over a predetermined field of view. This field may cover azimuth and elevation angles of 40°, for example. As the scan mirror is thusly moved, the narrow light beam scans the field of view. When the scan mirror directs the light beam toward a target retroreflector, the reflected light is received by the scan mirror and imaged onto the face of the photomultiplier. The photomultiplier is electronically scanned to determine the exact location of the image point. Thus, the position of the servo shafts (determined by shaft angle resolver) provides a coarse indication of the position of the target retroreflector in azimuth and elevation, and the photomultiplier provides a fine indication.

Figure 6:
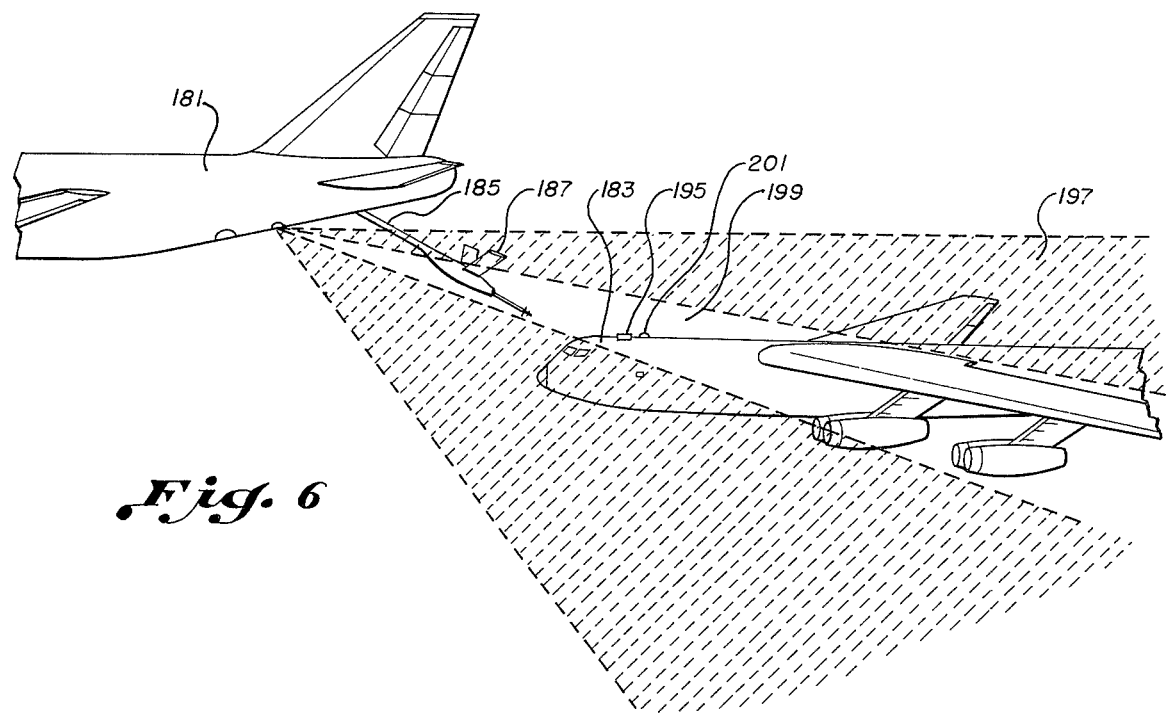
FIG. 6 is a pictorial view also illustrating two aircraft oriented with respect to one another for refueling purposes.
Figure 7:
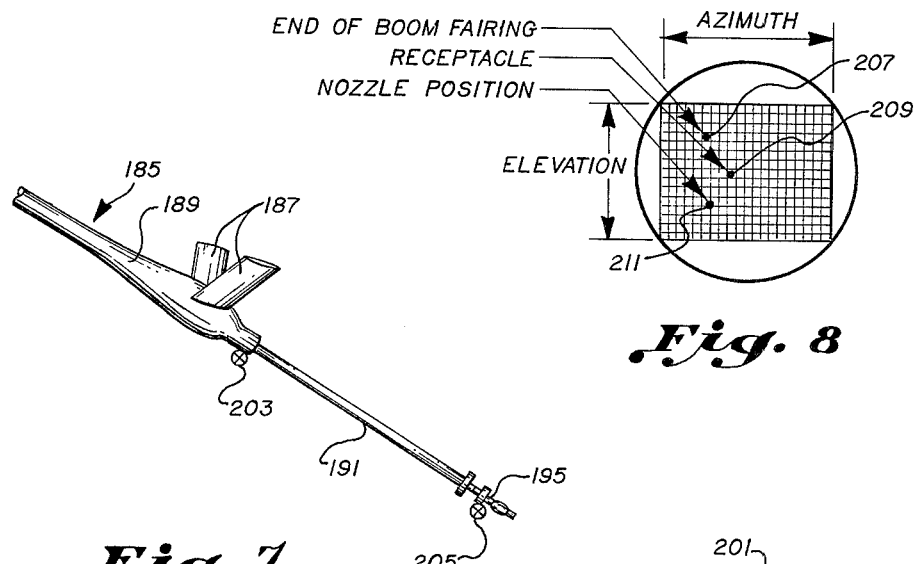
FIG. 7 is a pictorial view of an aerial boom having retroreflectors mounted thereon.

FIG. 6 illustrates a tanker aircraft 181 and a receiver aircraft 183. As previously indicated, an aerial boom 185 extends downwardly and rearwardly from the tanker aircraft 181. Ruddervators 187 are attached in the vicinity of the boom fairing 189 (FIG. 7). The ruddervators allow the boom operator, through a suitable mechanical or electromechanical mechanism, to control the angular position of the boom fairing. Alternatively, an automatic control system can be used via the ruddervators to control the angular position of the boom fairing 189. Extendable outwardly from the boom fairing is a telescoping tube 191 which terminates at a nozzle 193. The nozzle 193 is suitable for fitting into a refueling receptacle 195 located on the receiving aircraft 183.

As can be seen in FIG. 6, the field of view 197 of the scan mirror encompasses the position of the receiver aircraft 183, when the receiver aircraft is positioned behind and beneath the tanker aircraft 181. The field of view 199 of the photomultiplier covers only a small portion of the field of view 197 of the scan mirror. The position of the scan mirror and the position of the image on the face of the photomultiplier uniquely define the position of the target retroreflector 201 mounted on the receiver aircraft and, thus, the position of the receiver aircraft (in azimuth and elevation) with respect to the tanker aircraft. The range between the two aircraft may be determined, as previously described, by measuring the phase difference between the transmitted and received beams.

Preferably, as illustrated in FIG. 7, in addition to the retroreflector 201 located on the fuselage of the receiving aircraft 183, a second retroreflector 203 is located adjacent to the nozzle 193. When the boom is lowered, these retroreflectors 203 and 205 are, thus, also within the field of view of the scan mirror. Thus, they also come within the field of view of the photomultiplier.

Figure 8:
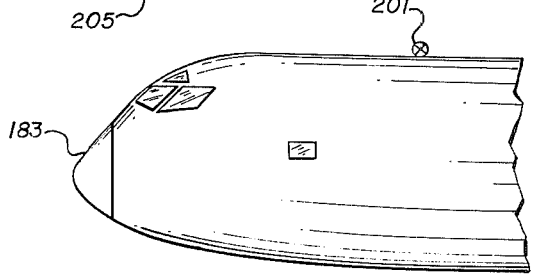
FIG. 8 is a view of the images formed by retroreflectors on the surface of an image dissector tube.

When all three reflectors are in the photomultiplier field of view at the same time, three retroreflector images 207, 209 and 211 (FIG. 8) are all created on the face of the photomultiplier at the same time. Thus, the outputs of the servo resolvers and the output of the photomultiplier provide information adequate to create displays displaying the relative positions in azimuth and elevation of the three retroreflectors. Such displays can be formed on cathode ray tube faces, for example. Alternatively, other types of two-dimensional display or display instruments can be used. In any event, range information is also displayed. This information allows the pilot of the receiver aircraft to precisely move his aircraft into a position wherein the refueling receptacle 195 can be connected to the nozzle 193 by the boom operator. Alternatively, the autopilot of the receiver aircraft can be controlled by the generated signals to move the receiver aircraft into the desired position, with the receiver pilot merely viewing the display in order to manually override the autopilot, should a situation arise requiring him to do so. Also, if desired, the signals generated by the sensor system can be used to automatically control the position of the nozzle. Further, these signals can be used to control the autopilot of the tanker aircraft. Thus, the invention can be used in a variety of modes of operation extending from a manual mode to a fully automatic mode, with override, depending upon the capabilities of the involved aircraft.

Figure 9:
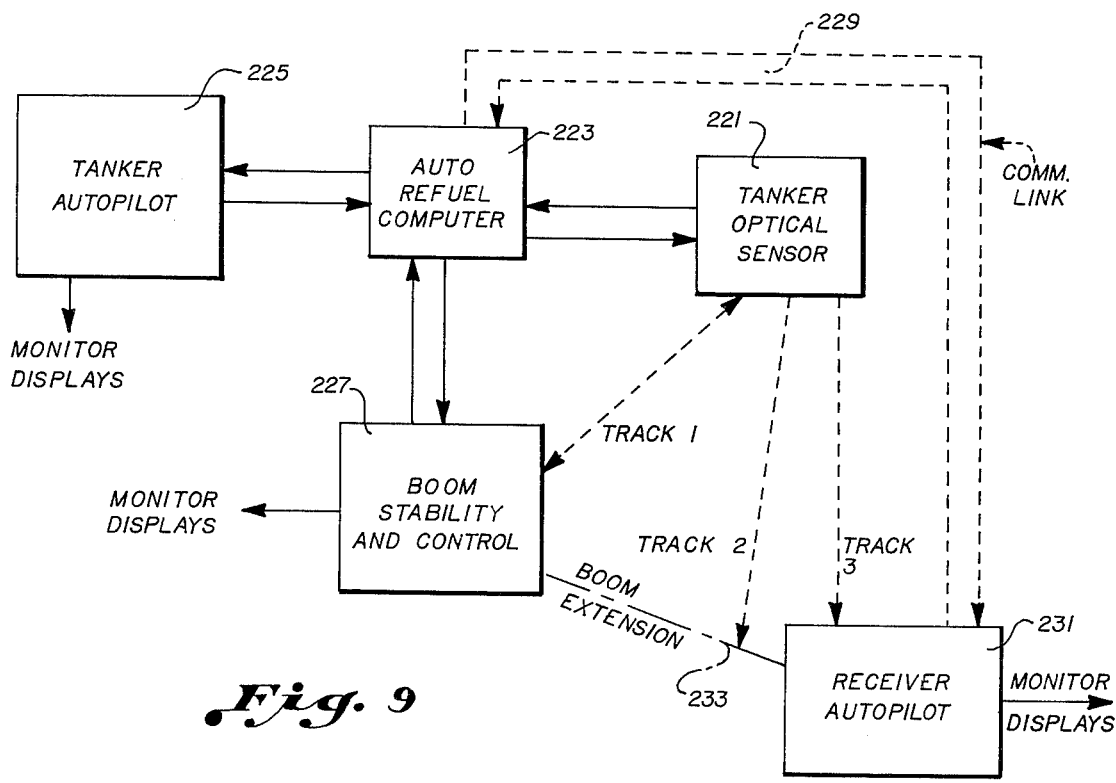
FIG. 9 is a block diagram of an automatic control system formed in accordance with the invention; and, FIG. 10 is a schematic diagram illustrating a retroreflector array suitable for mounting on a remotely piloted aircraft.

FIG. 9 is a block diagram illustrating a completely automatic mode of operation wherein the signals generated by the tanker sensor system 221 are applied to an automatic refueling computer 223. In addition, signals generated by the automatic refueling computer 223 are applied to the tanker optical sensor for scanning and other control purposes. The automatic refueling computer 223, because it is mounted in the tanker aircraft, is electrically coupled to the tanker autopilot 225 and to a boom stability and control circuit 227. A communication link 229 couples the automatic refueling computer 223 to the autopilot 231 of the receiver aircraft. A dash-dot line 233 representing the boom runs between the tanker aircraft and the receiver aircraft. Moreover, three dashed lines designated track 1, track 2 and track 3 illustrate the transmission and reception paths of the light beams flowing between the retroreflectors, located on the boom, the nozzle and the receiver aircraft, and the sensor system 221. Finally, monitor displays which provide for visually viewing the operation of the system are illustrated as being coupled to the tanker autopilot, the boom stability and control circuit, and the receiver autopilot. The monitor displays allow the associated pilots and boom operator to observe the automatic operation of the system during refueling so that they can override such operation if necessary.

In operation, the sensor system generates the angular position and range information signals previously described. In accordance with these signals, the automatic refueling computer generates: tanker control signals adapted to control the position of the tanker aircraft; boom control signals adapted to control the position of the boom fairing and the boom nozzle; and, receiver control signals adapted to control the position of the receiver aircraft. These control signals bring the nozzle into contact with the refueling receptacle of the receiver aircraft. Thereafter, fuel is automatically transferred from the tanker aircraft to the receiver aircraft. Should minor turbulence cause the aircraft to start to move apart, the sensor system automatically senses this movement and so informs the automatic refueling computer 223. The automatic refueling computer then generates control signals adapted to compensate for the turbulence and maintain the connection. Should a broken connection occur due to abnormal turbulence or some other undesired condition occurring, it is rapidly, automatically re-established in the same manner that it was initially established.

It will be appreciated from the foregoing description that the heart of the invention is a sensor system suitable for generating information signals useful in manually, semiautomatically, or automatically controlling the orientation of a receiver aircraft with respect to a tanker aircraft. The preferred sensor system uses electromagnetic energy in the optical spectrum in the wavelength region between 0.2 and 20 microns for locating the position of a plurality of retroreflectors. Because of the high data rate, approximately 7.5 kHz, and simultaneous, multiple target tracking, information regarding the position of the receiver aircraft and the boom is essentially immediately available at all times. Moreover, because CW modulated light beams are utilized, the range information generated is highly accurate. The ranging electronics and the tracking electronics generate near real time positional information. This information is smoothed and translated into rectangular coordinate information by the computer. In addition, translational rate information is derived. In a manual mode of operation, the rectangular coordinate information is utilized to create monitor displays which include rate information. In the receiver aircraft, preferably, the display is a "heads-up" display, whereby the pilot can view the display at the same time he is viewing the boom from his seat in the cockpit of the receiver aircraft. Either a movable scanning system or a "strapdown" system using only a wide angle optical system and image dissector can be used. In most instances, the strapdown system is preferred for reliability and other reasons. As a further alternative, the mechanical scanning operation can be terminated when the target retroreflector is sensed. Thereafter, continuous digital tracking by the photomultiplier is provided. Preferably, such a system will include a feedback arrangement adapted so as to move the scan mirror in a manner such that the receiver aircraft retroreflector image is maintained near the center of the image dissector.

As alluded to above, in addition to providing a mechanism for use in in-flight refueling, the sensor system of the invention can also be utilized for other purposes. For example, the sensor system can be mounted in a mother ship and used to depict the position of remotely piloted aircraft during capture or, for that matter, control the automatic capture of such aircraft. To achieve such results, however, the angular attitude of the remotely piloted aircraft itself, as well as its orientation with respect to the mother ship, must be determined. The invention provides for such a determination by mounting a plurality of retroreflectors (as opposed to a single retroreflector) in a predetermined array on the remotely piloted aircraft.

Figure 10:
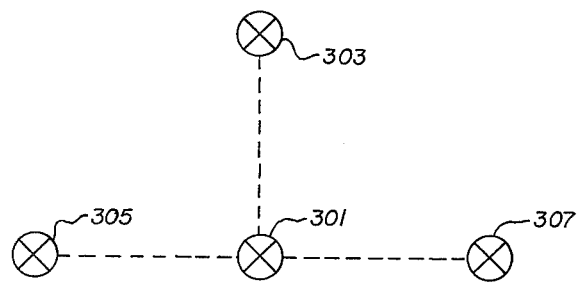

The retroreflector array can take on a variety of forms. One such form is illustrated in FIG. 10 and comprises four retroreflectors 301, 303, 305 and 307. The first and second retroreflectors 301 and 303 are arrayed such that they define or are related to the vertical axis of the remotely piloted aircraft. The third and fourth retroreflectors 305 and 307 are located on either side of the first retroreflector 301 and define a straight line or axis lying at right angles to the line or axis defined by the first and second retroreflectors. Thus, the "right angle" line may define, or be related to, the center line of the wings, for example.

Each of the retroreflectors illustrated in FIG. 10 is tracked in a multiple track mode. The first retroreflector 301 is the central reference point and the other three retroreflectors define corner points at known distances from each other. The central and corner retroreflectors create reflected beams which cause the sensor to generate information signals that define the elevation and azimuth position of the remotely piloted aircraft with respect to the mother ship plus the range therebetween. The retroreflector created signals also permit a suitable computer to calculate in real time the translational positions of the remotely piloted aircraft.

The second retroreflector 303 allows a differential range measurement to be made relative to the first retroreflector 301 and, at a known separation on the aircraft on which the array is mounted, the computer can calculate the pitch angle of this array and, thus, the pitch of the aircraft on which the array is mounted. In a like manner, the yaw angle can be determined from either the first retroreflector 301 and one or the other of the third and fourth retroreflectors 305 and 307, and the roll angle can be determined with differential angular measurements between the first retroreflector 301 and the second retroreflector 303, and the third or fourth retroreflectors. The computer can also derive translational and angular rates with rapid data sampling at known intervals. In this manner, all of the information necessary to determine the orientation of the remotely piloted aircraft, plus the rate of orientation changes, is generated. This information, in combination with the information regarding the location of the remotely piloted vehicle with respect to the mother ship is all the positional control data necessary for the two ships to be brought together and the remotely piloted aircraft positioned such that it can be captured by the mother ship.

While preferred embodiments of the invention have been illustrated and described, it will be appreciated by those skilled in the art and others that various changes can be made therein without departing from the spirit and scope of the invention. Some of these modifications have been briefly discussed above. Other modifications include still different types of electronic subsystems for interpreting the information contained in the reflected light beam. Moreover, a variety of different types of modulated light sources can be utilized. In this regard, while pulsed light sources can be used, continuous wave light sources are preferred.

Finally while only a single refueling boom has been illustrated and described, it will be appreciated that the invention can be expanded to provide for multiple simultaneous refueling connections to several aircraft using tanker aircraft wing tip locations, for example. Hence, the invention can be practiced otherwise than as specifically set forth herein.

The embodiments of the invention in which an exclusive property or privilege is claimed are defined as follows:

1. Apparatus suitable for use in in-flight orienting a first aircraft with respect to a second aircraft comprising:
  1. reflection means mounted on said first aircraft for receiving a portion of an electromagnetic beam transmitted by a source of electromagnetic energy and reflecting said portion of said electromagnetic beam back toward the electromagnetic source of said electromagnetic beam;
  2. a sensor mounted on said second aircraft, said sensor comprising:
     a. electromagnetic transmisssion means for transmitting an electromagnetic beam in a predetermined direction over a predetermined field of view;
     b. electromagnetic receiving means for receiving the portion of said transmitted electromagnetic beam reflected by said reflection means mounted on said first aircraft when said first aircraft is in said field of view;
     c. position determining means coupled to said electromagnetic receiving means for determining the position of said portion of said transmitted electromagnetic beam reflected by said reflection means when said reflection means is in said field of view; and,
     d. ranging means connected to said receiving means and said transmitting means for determining the time difference between the transmission of said transmitted electromagnetic beam and the reception of said portion of said transmitted electromagnetic beam reflected by said reflection means and, thus, the range between said first aircraft and second aircraft;
  3. display means mounted in said second aircraft and connected to said position determining means and said ranging means for displaying the position of said first aircraft with respect to said second aircraft, and the range between said first aircraft and said second aircraft; and,
  4. control means connected to said position determining means and to said ranging means for receiving signals related to the position of said portion of said electromagnetic beam reflected by said reflection means in said field of view and the range between said first and second aircraft and, in accordance therewith, controlling the position of said first aircraft with respect to said second aircraft, said control means comprising:
     a. an autopilot mounted in said first aircraft and coupled to the controls of said first aircraft so as to control the movement of said first aircraft;
     b. autopilot control signal generating means mounted in said second aircraft and connected to said position determining means and to said ranging means for generating signals suitable for controlling the autopilot of said first aircraft and, thus, the movement of said first aircraft in accordance with the signals generated by said position determining means and said ranging means related to the position of said portion of said electromagnetic beam reflected by said reflection means in said field of view in the range between said first and second aircraft; and,
     c. a communication link between said first and second aircraft for transmitting the signals generated by said autopilot control means to said autopilot mounted in said first aircraft.

2. Apparatus suitable for use in in-flight orienting a first aircraft with respect to a second aircraft as claimed in claim 1 wherein the frequency of said electromagnetic beam is within the light spectrum.

3. Apparatus suitable for use in in-flight orienting a first aircraft with respect to a second aircraft as claimed in claim 2, wherein said reflection means comprises a plurality of retroreflectors mounted on said first aircraft in a predetermined array, each of said retroreflectors reflects a part of said portion of said transmitted electromagnetic beam.

4. Apparatus suitable for use in in-flight orienting a first aircraft with respect to a second aircraft as claimed in claim 3, wherein said transmission means comprises a light source, a driver connected to said light source for modulating the light emitted by said light source, and projecting optics suitable for receiving the light generated by said light source and projecting said light outwardly as a light beam.

5. Apparatus suitable for use in in-flight orienting a first aircraft with respect to a second aircraft as claimed in claim 4, wherein said receiving means comprises receiving optics suitable for receiving said portion of said electromagnetic beam reflected by said retroreflectors and wherein said position determining means comprises an image dissector tube, said image dissector tube being mounted such that said portion of said electromagnetic beam reflected by said retroreflectors received by said receiving optics is imaged onto the face of the image dissector tube.

6. Apparatus suitable for use in in-flight orienting a first aircraft with respect to a second aircraft as claimed in claim 5, including:
  a scan mirror mounted so as to intersect the light beam output of said projecting optics and transmits said light beam output from said second aircraft in a scanning manner, said scan mirror also being mounted so as to intersect the portion of said electromagnetic beam reflected by said retroreflectors and direct said portion toward said receiving optics; and,
  electromechanical means connected to said scan mirror for moving said scan mirror in a scanning manner over said field of view.

7. Apparatus suitable for use in in-flight orienting a first aircraft with respect to a second aircraft as claimed in claim 2 wherein said reflection means is a retroreflector.

8. Apparatus suitable for use in in-flight orienting a first aircraft with respect to a second aircraft as claimed in claim 7, wherein said ranging means includes:
  phase detecting means suitable for detecting the phase difference between said transmitted electromagnetic beam and said portion of said electromagnetic beam reflected by said reflection means; and
  digital counting means connected to said phase detecting means for providing a digital pulse count related to the range between said first and second aircraft, said digital counting means being started at a predetermined phase point in said transmitted beam and stopped when a related phase point in said received beam occurs.

9. Apparatus suitable for use in in-flight refueling a receiver aircraft by a tanker aircraft via a refueling boom comprising:
1. first reflection means mounted on said receiver aircraft for receiving a portion of an electromagnetic beam transmitted by a source of electromagnetic energy and reflecting said portion of said electromagnetic beam back toward the electromagnetic source of said electromagnetic beam as a first reflected beam;
2. second reflection means mounted on said boom for receiving a portion of a transmitted electromagnetic beam and reflecting said portion of said electromagnetic beam back toward the source of said electromagnetic beam as a second reflected beam;
3. a sensor mounted on said tanker aircraft, said sensor comprising:
   a. electromagnetic transmission means for transmitting an electromagnetic beam in a predetermined direction over a predetermined field of view;
   b. electromagnetic receiving means for receiving said first and second reflected beams of electromagnetic energy reflected by said first and second reflection means mounted on said receiver aircraft and said boom when said receiver aircraft and said boom are in said field of view;
   c. position determining means coupled to said electromagnetic receiving means for determining the position of said first and second reflected beams in said field of view; and,
   d. ranging means connected to said receiving means and said transmitting means for determining the time difference between transmission of said electromagnetic beam to, and reception of said first reflected beam from, said receiver aircraft and, thus, the range between said receiver aircraft and said tanker aircraft; and,
4. control means connected to said position determining means and to said ranging means for receiving signals related to the position of said received beams in said field of view and the range between said receiver and tanker aircraft and, in accordance therewith, controlling the position of said receiver aircraft with respect to said tanker aircraft, said control means comprising:
   a. an autopilot mounted in said receiver aircraft and coupled to the controls of said receiver aircraft so as to control the movement of said receiver aircraft;
   b. autopilot control signal generating means mounted in said tanker aircraft and connected to said position determining means and to said ranging means for generating signals suitable for controlling the autopilot of said receiver aircraft and, thus, the movement of said receiver aircraft in accordance with the signals generated by said position determining means and said ranging means related to the position of said received beams in said field of view and the range between said receiver and tanker aircraft; and
   c. a communication link between said receiver and tanker aircraft for transmitting the signals generated by said autopilot control means to said autopilot mounted in said receiver aircraft.

10. Apparatus suitable for use in in-flight refueling a receiver aircraft by a tanker aircraft via a refueling boom as claimed in claim 9 wherein said control means also controls the position of said boom.

11. Apparatus suitable for use in in-flight refueling a receiver aircraft by a tanker aircraft via a refueling boom as claimed in claim 10 wherein said transmission means comprises a light source, a driver connected to said light source for modulating the light emitted by said light source, and projecting optics suitable for receiving the light generated by said light source and projecting said light outwardly as a light beam.

12. Apparatus suitable for use in in-flight refueling a receiver aircraft by a tanker aircraft via a refueling boom as claimed in claim 11 wherein said receiving means comprises receiving optics suitable for receiving said received beams and wherein said position determining means comprises an image dissector tube, said image dissector tube being mounted such that said reflected beams received by said receiving optics are imaged onto the face of the image dissector tube.

13. Apparatus suitable for use in in-flight refueling a receiver aircraft by a tanker aircraft via a refueling boom as claimed in claim 12 including:
a scan mirror mounted so as to intersect the light beam output of said projecting optics and transmits said light beam output from said tanker aircraft in a scanning manner, said scan mirror also being mounted so as to intersect said received light beams and direct said beams toward said receiving optics; and
electromechanical means connected to said scan mirror for moving said scan mirror in a scanning manner over said field of view.

14. Apparatus suitable for use in in-flight refueling a receiver aircraft by a tanker aircraft via a refueling boom as claimed in claim 9 including display means connected to said position determining means and to said ranging means for displaying the position of said boom and said receiver aircraft with respect to said tanker aircraft, and for displaying the range and range rates between said two aircraft.

15. Apparatus suitable for use in in-flight refueling a receiver aircraft by a tanker aircraft via a refueling boom as claimed in claim 14 wherein said display means includes a first display associated with said receiver aircraft and a second display associated with said tanker aircraft.

16. Apparatus suitable for use in in-flight refueling a receiver aircraft by a tanker aircraft via a refueling boom as claimed in claim 9 wherein the frequency of said electromagnetic beam is within the light spectrum between 0.2 and 20 microns wavelengths.

17. Apparatus suitable for use in in-flight refueling a receiver aircraft by a tanker aicraft via a refueling boom as claimed in claim 16 wherein said first and second reflection means are retroreflectors.

18. Apparatus suitable for use in in-flight refueling a receiver aircraft by a tanker aircraft via a refueling boom as claimed in claim 16 wherein said ranging means includes:
phase detecting means suitable for detecting the phase difference between said transmitted electromagnetic beam and said first reflected beam; and,
digital counting means connected to said phase detecting means for providing a digital pulse count related to the distance between said receiver aircraft and said tanker aircraft, said digital counting means being started at a predetermined phase point in said transmitted beam and stopped when a related phase point in said received beam occurs.

* * * * *

UNITED STATES PATENT AND TRADEMARK OFFICE
CERTIFICATE OF CORRECTION

PATENT NO. : 3,917,196

DATED : November 4, 1975

INVENTOR(S) : Pond et al

It is certified that error appears in the above-identified patent and that said Letters Patent are hereby corrected as shown below:

Column 2, line 18, delete "posiition" and insert --position--;
line 23, delete "semiautamatically" and insert --semiautomatically--;

Column 6, line 14, delete "vioce" and insert --voice--;

Column 17, line 4, delete "1." and insert --1)--;
line 10, delete "2." and insert --2)--;
line 12, delete "a." and insert --a)--;
line 16, delete "b." and insert --b)--;
line 21, delete "c." and insert --c)--;
line 27, delete "d." and insert --d)--;
line 36, delete "3." and insert --3)--;
line 42, delete "4." and insert --4)--;
line 51, delete "a." and insert --a)--;
line 54, delete "b." and insert --b)--;

Column 19, line 4, delete "1." and insert --1)--;
line 11, delete "2." and insert --2)--;
line 16, delete "3." and insert --3)--;
line 18, delete "a." and insert --a)--;
line 22, delete "b." and insert --b)--;
line 28, delete "c." and insert --c)--;
line 32, delete "d." and insert --d)--;
line 39, delete "4." and insert --4)--;
line 47, delete "a." and insert --a)--;
line 51, delete "b." and insert --b)--;
line 62, delete "c." and insert --c)--;

Signed and Sealed this thirtieth Day of March 1976

[SEAL]

Attest:

RUTH C. MASON
Attesting Officer

C. MARSHALL DANN
Commissioner of Patents and Trademarks